US008334404B2

(12) United States Patent
Lucht et al.

(10) Patent No.: US 8,334,404 B2
(45) Date of Patent: Dec. 18, 2012

(54) ELECTROLYTE FOR LITHIUM ION BATTERIES

(75) Inventors: Brett Lucht, Wakefield, RI (US); Ang Xiao, Kingston, RI (US); Li Yang, Kingston, RI (US); Mengqing Xu, Kingston, RI (US)

(73) Assignee: Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 502 days.

(21) Appl. No.: 12/553,366

(22) Filed: Sep. 3, 2009

(65) Prior Publication Data

US 2010/0062346 A1    Mar. 11, 2010

Related U.S. Application Data

(63) Continuation of application No. PCT/US2008/056161, filed on Mar. 7, 2008.

(60) Provisional application No. 60/893,734, filed on Mar. 8, 2007.

(51) Int. Cl.
*C07F 9/02* (2006.01)

(52) U.S. Cl. ........ 562/816; 562/597; 429/199; 429/203; 429/321; 429/326

(58) Field of Classification Search ........................ None
See application file for complete search history.

(56) References Cited

U.S. PATENT DOCUMENTS

| | | | |
|---|---|---|---|
| 5,324,811 | A | 6/1994 | You et al. |
| 6,210,830 | B1 | 4/2001 | Sartori et al. |
| 6,395,431 | B1 | 5/2002 | Gao et al. |
| 6,673,492 | B2 | 1/2004 | Yao et al. |
| 6,767,671 | B2 | 7/2004 | Itagaki et al. |
| 6,849,752 | B2 * | 2/2005 | Tsujioka et al. ............... 556/41 |
| 6,884,544 | B2 | 4/2005 | Barker et al. |
| 7,026,068 | B2 | 4/2006 | Takahashi et al. |
| 2001/0028980 | A1 | 10/2001 | Yoshimura |
| 2004/0157130 | A1 | 8/2004 | Ohsawa et al. |
| 2005/0089758 | A1 | 4/2005 | Kim |
| 2005/0164081 | A1 | 7/2005 | Ogura et al. |
| 2006/0046155 | A1 | 3/2006 | Inagaki et al. |
| 2006/0199080 | A1 | 9/2006 | Amine |

FOREIGN PATENT DOCUMENTS

| | | |
|---|---|---|
| EP | 1679760 | 7/2006 |
| EP | 1892789 | 2/2008 |
| JP | 2007311217 | 11/2007 |

OTHER PUBLICATIONS

International Preliminary Report on Patentability,PCT/ US2008/056161 (Chapter 1 of the Patent Cooperation Treaty), Mar. 8, 2007, USA.

Xiao et al.,Thermal Reactions of LiPF6 with Added LiBOB Electrolyte Stabilization and Generation of LiF4OP, Electrochemical and Solid-State Letters, pp. A241-A244,vol. 10,The Electrochemical Society,inc.,USA, Aug. 23, 2007.
Lu et al.,Thermal and electrochemical characterization of MCMB/LiNi1/3 Co1/3Mn1/3/O2 using LIBoB as an electrolyte additive,Journal of Power Sources, pp. 1074-1079,vol. 163, Elsevier B.V., USA, Nov. 9, 2006.
Liu et al., Lithium difluoro (oxalato) borate as a functional additive for lithium-ion batteries, Electrochemistry Communications, pp. 475-479,vol. 9, Elsevier B.V., USA, Nov. 9, 2006.
Xiao et al. Thermal reactions of mesocarbon microbead (MCMB) particles in LiPF6-based electrolyte, Journal of Power Sources, pp. 1282-1288, vol. 162, Elsevier B.V. USA, Sep. 7, 2006.
Li et al., Lithium-Ion Batteries: Thermal Reactions of Electrolyte with the Surface of Metal Oxide Cathode Particles, Journal of The Electrochemical Society, pp. A1617-A1625, vol. 153 , The Electrochemical Society, Inc., USA, Jun. 20, 2006.
Zhang, An unique lithium salt for the improved electrolyte of Li-ion battery, Electrochemistry Communications, pp. 1423-1428, vol. 8, Elsevier B.V., USA, Aug. 1, 2006.
Campion et al., Thermal Decomposition of LiPF6-Based Electrolytes for Lithium-Ion Batteries, Journal of The Electrochemical Society, pp. A2327-A2334, vol. 152, The Electrochemical Society, Inc., USA, Oct. 24, 2005.
Li et al., Additives for Stabilizing LiPF6 Based Electrolytes Against Thermal Decomposition, Journal of The Electrochemical Society, pp. A1361-A1365, vol. 152, The Electrochemical Society Inc., USA, Jun. 7, 2005.
Xu et al., LiBOB: Is it an alternative salt for lithium ion chemistry, Journal of Power Sources, pp. 79-85, vol. 146, Elsevier B.V., USA, May 31, 2005.
Campion et al., Suppression of Toxic Compounds Produced in the Decomposition of Lithium-Ion Battery Electrolytes, Electrochemical and Solid-State Letters, pp. A194-A197, vol. 7 , The Electrochemical Society, Inc., USA, May 21, 2004. Herstedt et al., X-ray photoelectron spectroscopy of negative electrodes from high-power lithium-ion cells showing various levels of power fade, Eletrochimica Acta, pp. 5097-5110, vol. 49, Elsevier ltd., USA, Jul. 24, 2004.
International Preliminary Report on Patentability for PCT/US2009/049534 filed on Jul. 9, 2009, 11 pages.
International Search Report and Written Opinion for PCT/US2009/049534 filed on Jul. 9, 2009, 17 pages.

* cited by examiner

*Primary Examiner* — Sudhakar Katakam

(74) *Attorney, Agent, or Firm* — Gesmer Updegrove LLP

(57) ABSTRACT

A non-aqueous electrolyte usable in rechargeable lithium-ion batteries including a solution of $LiPF_6$/carbonate based electrolytes with low concentrations of LiFOP such that the thermal stability is increased compared to a standard lithium battery. A method of making lithium tetrafluorophospahte ($LiF_4C_2O_4$, LiFOP) including, reacting $PF_5$ with lithium oxalate, recrystallizing DMC/dichloromethane from a 1:1 mixture of to separate $LiF_4OP$ from $LiPF_6$ to form a lithium salt. An electric current producing rechargeable Li-ion cell. The rechargeable lithium ion cell includes an anode, a cathode, and a non-aqueous electrolyte comprising a solution of a lithium salt in a non-aqueous organic solvent containing lithium tetrafluorooxalatophosphate ($LiPF_4(C_2O_4)$, $LiF_4OP$).

10 Claims, 5 Drawing Sheets

LiPF$_4$C$_2$O$_4$

ELECTROLYTE FOR LITHIUM ION BATTERIES

PRIORITY INFORMATION

The present application is a continuation application of PCT/US08/56161, filed on Mar. 7, 2008 which claims priority from Provisional Patent Application 60/893,734 filed with the United States Patent and Trademark Office on Mar. 8, 2007.

GOVERNMENT SPONSORSHIP

The present invention was made with U.S. Government support under NSF/CIA (Award No. DMR-0442024) and the US Army Research Laboratory (Contract No. W911 QX-07-C-0026 to Yardney Technical Products). The U.S. Government has certain rights to this invention.

BACKGROUND OF THE PRESENT INVENTION

Lithium ion batteries (LIBs) are one of the most widely used portable power sources. However, loss of power and capacity upon storage or prolonged use especially at elevated temperature (>50° C.) limits the application of LIB for electric vehicle (EV) and hybrid electric vehicle (HEV) applications. The performance degradation is frequently linked to the thermal instability of lithium hexafluorophosphate and the reactions of the electrolyte with the surface of the electrode materials. This has prompted the development of alternative electrolytes for lithium ion batteries.

The most widely utilized lithium salt for lithium ion batteries is lithium hexafluorophosphate ($LiPF_6$). However, $LiPF_6$ has poor thermal and hydrolytic stability and is thus not ideal. One of the most widely investigated "alternative" salts for lithium ion battery electrolytes is lithium bisoxalatoborate ($LiB(C_2O_4)_2$, LiBOB). Lithium ion batteries containing LiBOB based electrolytes have been reported to operate up to 70° C. with little capacity fade. However, the use of LiBOB has been limited by the poor solubility of LiBOB in common carbonate solvents and the poor performance of LiBOB electrolytes at low temperature. LiBOB based electrolytes have been reported to generate a stable solid electrolyte interface (SEI) on the surface of the anode due to ring-open reactions of the oxalate moiety and the formation of trigonal borates.

SUMMARY OF THE INVENTION

In an effort to develop new salts for lithium ion battery electrolytes, lithium tetrafluorooxalatophosphate ($LiPF_4(C_2O_4)$, $LiF_4OP$) has been designed as a new compound. Upon discovery of this new and potentially interesting lithium salt, a synthetic method for the preparation of $LiF_4OP$ was developed.

These and other features and objectives of the present invention will now be described in greater detail with reference to the accompanying drawings, wherein:

DETAILED DESCRIPTION OF THE INVENTION

Figure 7:
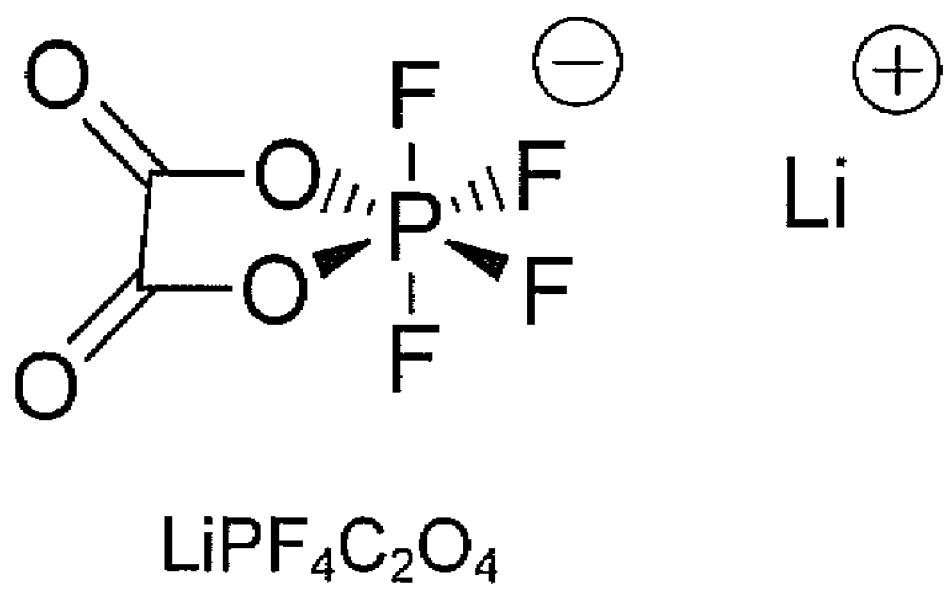
FIG. 7 is a schematic of a lithium salt.

Lithium tetrafluoro oxalato phosphate ($LiPF_4(C_2O_4)$) (as shown in FIG. 7) can be used as a lithium salt in the lithium battery. The salt has a high conductivity and solubility but is more thermally stable than the industry standard $LiPF_6$ which could lead to a longer calendar life performance.

EXPERIMENTAL

Battery grade carbonate solvents were obtained from EM Industries (located in Japan), $LiPF_6$ was obtained from Hashimoto Chemical Corporation in Japan, without further purification. Purity was verified by Nuclear Magnetic Resonance (NMR) spectroscopy. Samples for NMR spectroscopy were prepared in an Ar-filled glove box followed by flame sealing and stored for varying lengths of time at 85° C. NMR analyses were conducted on a JEOL 400 MHz NMR spectrometer. $^1H$ NMR resonances were referenced to EC at 4.51 ppm, $^{19}F$ NMR resonances were referenced to $LiPF_6$ at 65.0 ppm and $^{31}P$ NMR resonances were referenced to $LiPF_6$ at −145.0 ppm.

Lithium tetrafluorooxalatophosphate ($LiF_4OP$) was synthesized by the reaction of $PF_5$ gas, generated by heating solid $LiPF_6$ to 200° C., transferred via a slow stream of $N_2$ into a suspension of lithium oxalate in dimethyl carbonate at 25° C. The reaction mixture was allowed to stir at 25° C. for 3 h followed by purification by repeated recrystallization from 1:1 dimethyl carbonate/dichloromethane. An electrolyte composed of 1:1 $LiPF_6/LiF_4OP$ in 1:1:1 ethylene carbonate (EC)/diethyl carbonate (DEC)/dimethyl carbonate (DMC) was examined in lithium-ion coin cells with $LiNi_{0.8}Co_{0.2}O_2$ and mesocarbon microbead (MCMB) graphite as cathode and anode materials respectively. The cells underwent four formation cycles (C/20 and three C/10).

TABLE 1

$^{19}F$, $^{31}P$ and $^{11}B$ NMR assignments of Lithium hexafluoro phosphate and lithium tetrafluorooxalatophosphate

| Salts | $^{19}F$ ppm (mult, $J_{P-F}$ or $J_{B-F}$) | $^{31}P$ ppm (mult, $J_{P-F}$) | $^{11}B$ ppm |
|---|---|---|---|
| $LiPF_6$ | 65.0 (d, 709) | −145.0 (sept, 709) | — |
| $LiF_4OP$ | 79.5 (d-t 776, 52) 62.7 (d-t 748, 52) | −142.2 (t-t 776, 748) | — |

Preparation and Investigation of $LiF_4OP$

Figure 1:
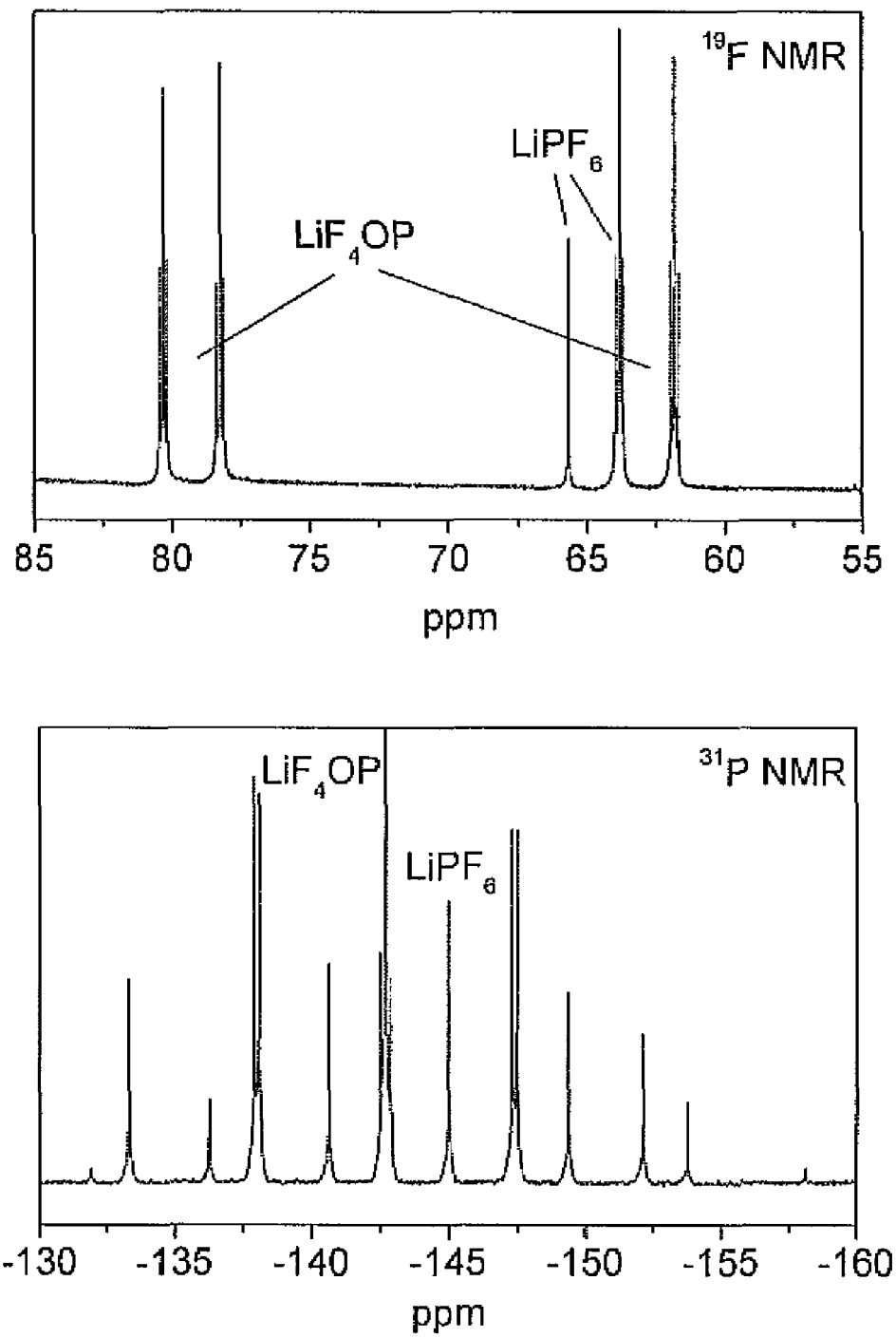
FIG. 1 is a $^{19}F$, and $^{31}P$ NMR spectra of $LiF_4OP$ electrolyte.
Figure 2:
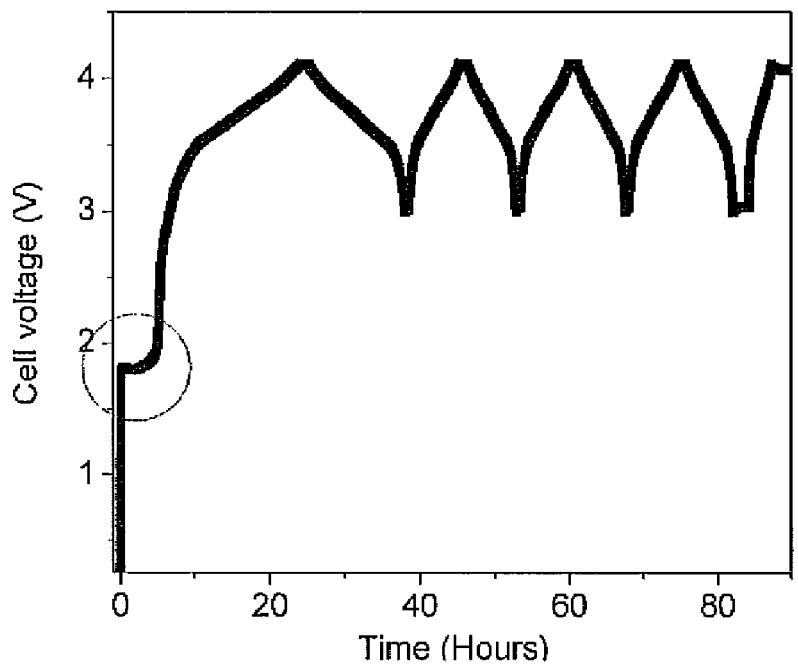
FIG. 2 is a graph of the charge-discharge characteristics of a coin cell containing 1:1 $LiPF_6/LiF_4OP$ in 1:1:1 EC/DEC/DMC for the first four charge-discharge cycles.

A 1:1 mixture of $LiF_4OP$ and $LiPF_6$ was prepared by the reaction of $PF_5$ with lithium oxalate (See Scheme 1). Repeated recrystallization from a 1:1 mixture of DMC/dichloromethane can be used to remove $LiPF_6$. An investigation of the thermal stability of carbonate solutions of $LiF_4OP$ and the use of 1:1 $LiPF_6/LiF_4OP$ in 1:1:1 EC/DMC/DEC as an electrolyte in lithium ion batteries was conducted. Dissolution of $LiF_4OP$ in 1:1:1 EC/DEC/DMC resulted in a clear colorless solution. $^{19}$F and $^{31}$P NMR spectroscopy confirmed the structure of LiF$_4$OP (FIG. 2). Thermal stability of 1.0 M LiF$_4$OP in EC: DEC: DMC (1:1:1) was investigated by NMR spectroscopy, Storage of the electrolyte at 85° C. for 3 months resulted in a slight yellowing of the solution, likely due to trace impurities, but no evidence for bulk electrolyte decomposition. The $^1$H, $^{19}$F, and $^{31}$P NMR spectra of the electrolyte revealed that a low concentration of the lithium fluorophosphate (OPF$_2$(OLi)) was generated during the first 48 hours of storage at 85° C. However, the concentration of OPF$_2$(OLi) did not increase upon storage for 3 months at 85° C. Incorporation of additive concentrations of LiF$_4$OP to LiPF$_6$ based electrolytes was investigated. The addition of 2% (wt) LiF$_4$OP to ternary electrolyte inhibited the thermal decomposition of the electrolyte.

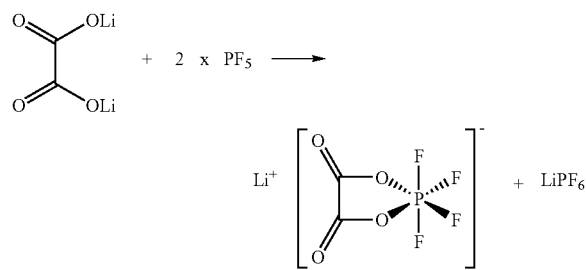

Scheme 1

Performance of Lithium-Ion Cells with 1:1 LiPF$_6$/LiF$_4$OP

Figure 3:
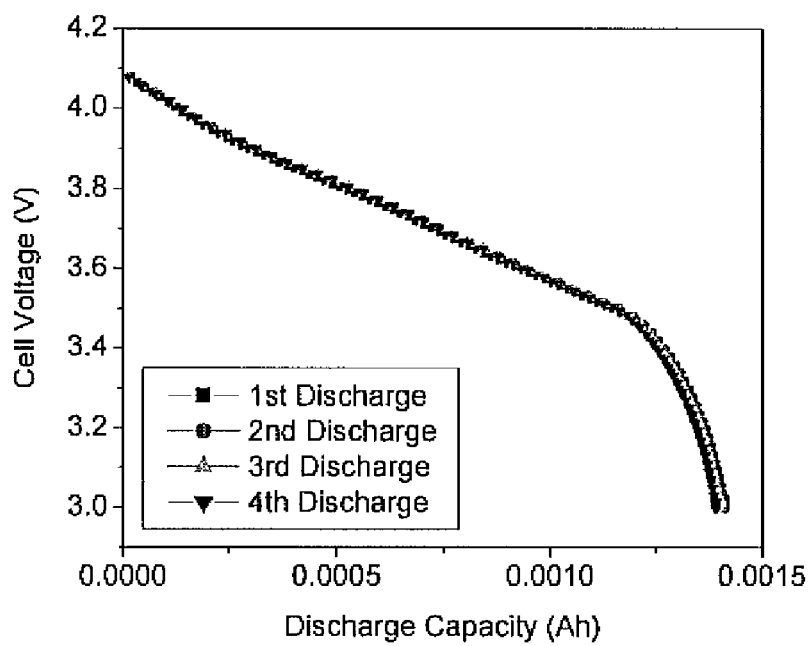
FIG. 3 is a graph of the discharge capacity (Ah) of coin cell containing 1:1 $LiPF_6/LiF_4OP$ in 1:1:1 EC/DEC/DMC during first four charge-discharge cycles.
Figure 4:
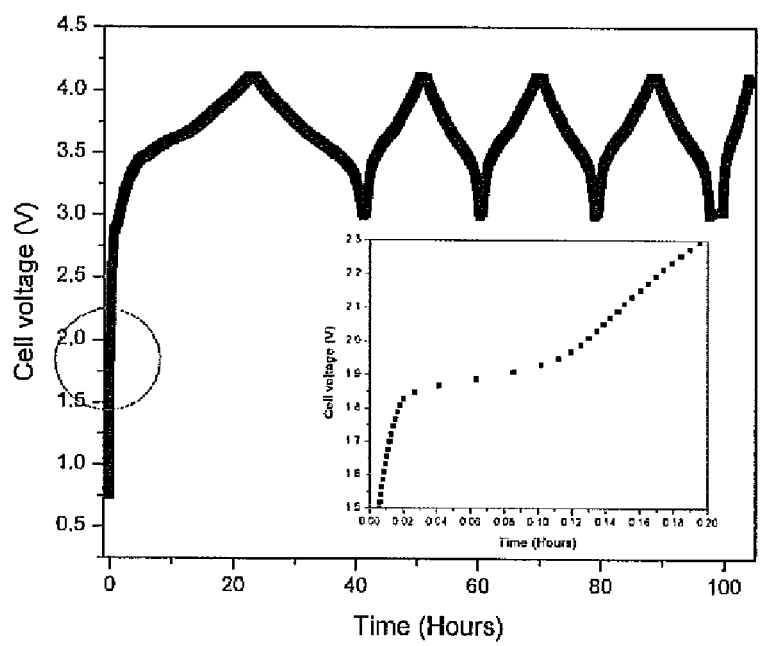
FIG. 4 is a graph of the charge-discharge characteristics of coin cell containing 1 M $LiPF_6$ with 2% (wt) $LiF_4OP$ in 1:1:1 EC/DEC/DMC for the first four charge-discharge cycles.
Figure 5:
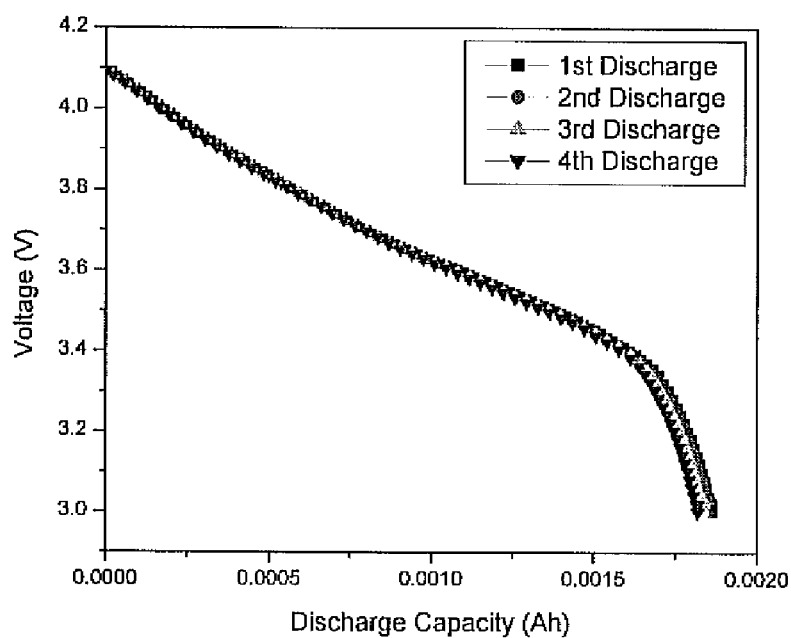
FIG. 5 is a graph of the discharge capacity (Ah) of coin cell containing 1 M $LiPF_6$ with 2% (wt) $LiF_4OP$ in 1:1:1 EC/DEC/DMC during first four charge-discharge cycles.
Figure 6:
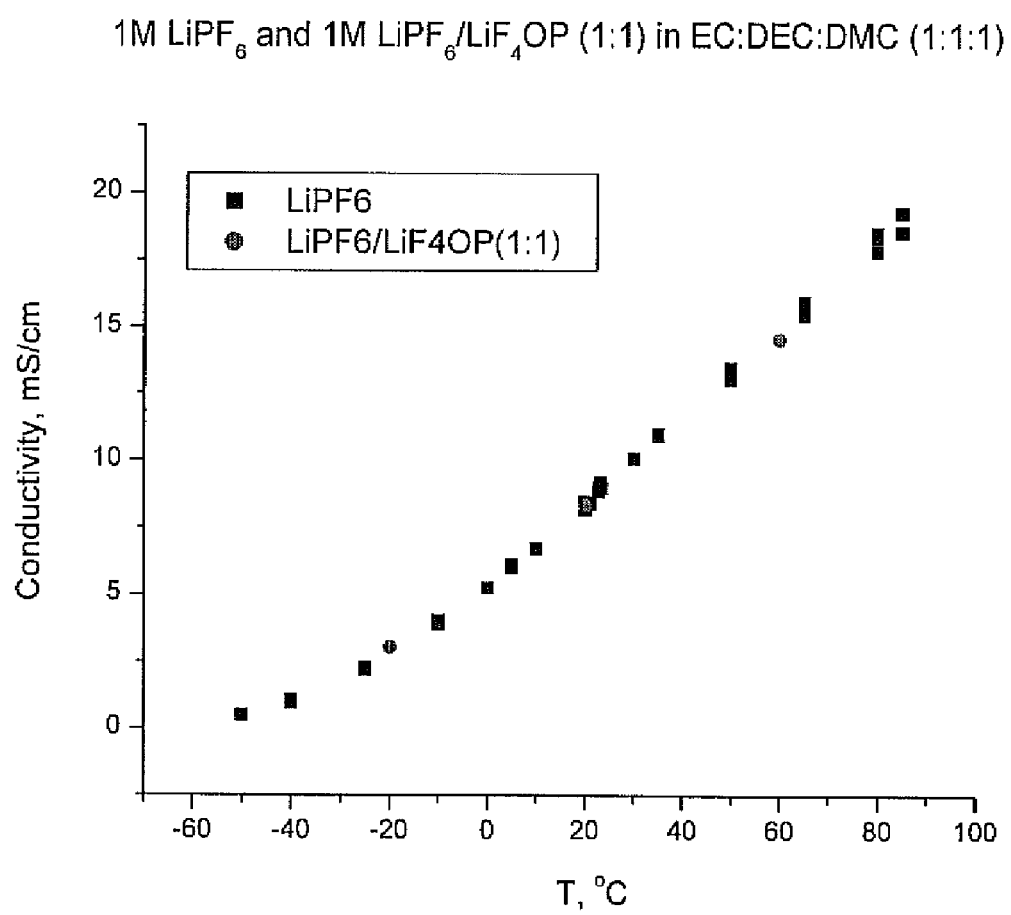
FIG. 6 is a graph of the conductivity of a 1:1 mixture of $LiPF_6/LiF_4OP$ vs $LiPF_6$ in a ternary mixture of carbonate solvents.

The effect of LiF$_4$OP on the initial cycling performance of coin cells was examined. The cells were cycled in the following schedule: four formation cycles (one at C/20 followed by three C/10 charge-discharge rate cycles) at 25° C., FIG. 3 is a representative data set of the charge-discharge characteristics of a coin cell containing 1:1 LiPF$_6$/LiF$_4$OP (1 M Li) in EC: DEC: DMC (1:1:1). The data suggested that the LiF$_4$OP electrolyte had good performance in LIB. Compared to cells containing ternary electrolyte, a plateau around 1.9 V was clearly observed during the first cycle due to the reduction of oxalate impurities in LiF$_4$OP. As with previous investigations with LiBOB electrolytes, the size of the 1.9 V plateau was dependent upon the concentration of LiF$_4$OP in LiPF$_6$. Cells containing 1:1 LiPF$_6$/LiF$_4$OP in 1:1:1 EC/DEC/DMC had good reversibility over the first four cycles, FIG. 4, suggested that LiF$_4$OP electrolytes were not detrimental to the lithium intercalation/deintercalation processes. The reversible capacity of cells containing 1:1 LiPF$_6$/LiF$_4$OP in 1:1:1 EC/DEC/DMC was similar to comparable cells containing ternary electrolyte. Addition of 2% (wt) LiF$_4$OP to ternary electrolyte results in shorter 1.9 V plateaus but similar cycling profiles.

A solution of LiPF$_6$/carbonate based electrolytes has a low concentration of LiF$_4$OP when the concentration is about 0.1-5.0% (by wt). This solution when used in a rechargeaboule lithium battery has increased thermal stability compared to a standard lithium battery. Whereas a concentration of about 5.0-95.0% (by wt) is considered as a high concentration.

An electric current producing rechargeable Li-ion cell has an anode; a cathode; and a non-aqueous electrolyte. The non-aqueous electrolyte includes a solution of a lithium salt in a non-aqueous organic solvent containing lithium tetrafluorooxalatophosphate (LiPF$_4$(C$_2$O$_4$), LiF$_4$OP). The anode may be a lithium intercalating compound where the said lithium intercalating compound is a carbonaceous material. The cathode may be a lithium intercalating transition metal compound. The lithium intercalating transition metal compound may be selected from the group consisting of LiCoO$_2$; LiNiO$_2$; LiNi$_{1-x}$Co$_x$O$_2$ where x is 0.3<x<1.0; LiMn$_2$O$_4$; LiV$_2$O$_5$; LiM$_x$N$_{1-x}$O$_2$, where M and N are transition metals and x has a value between zero and one; LiFePO$_4$; LiCrS$_2$; and LiVS$_2$. The organic solvent is selected from the group consisting of organic carbonates, esters, ethers, glymes, organic nitriles and sulfones as well as mixtures thereof.

In light of the foregoing, it will now be appreciated by those skilled in the art that various changes may be made to the embodiment herein chosen for purposes of disclosure without departing from the inventive concept defined by the appended claims.

We claim:

1. A method of making lithium tetrafluorophosphate (represented by LiPF$_4$C$_2$O$_4$, or LiF$_4$OP) for use as a lithium ion battery electrolyte, said method consisting essentially of the steps of:
    heating solid LiPF$_6$ to 200° C. to produce PF$_5$ gas;
    reacting the PF$_5$ gas with lithium oxalate; and
    recrystallizing from a 1:1 mixture of dimethyl carbonate (DMC)/dichloromethane to separate LiF$_4$OP from LiPF$_6$ to form a lithium salt.

2. The method as claimed in claim 1, wherein said lithium tetrafluorophosphate is lithium tetrafluoro oxalato phosphate (represented by LiPF$_4$C$_2$O$_4$).

3. The method as claimed in claim 1, wherein the LiPF$_6$ is provided in a solution of LiPF$_6$/carbonate based electrolytes with low concentrations of LiFOP of about 0.1-5.0% by wt.

4. The method as claimed in claim 1, wherein the LiPF$_6$ is provided in a solution of LiPF$_6$/carbonate based electrolytes with high concentrations of LiFOP of about 5.0-95.0% by wt.

5. The method as claimed in claim 1, wherein said lithium ion salt is:

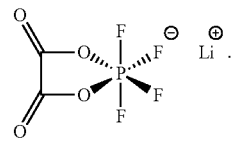

6. A method of making lithium tetrafluorophosphate (represented by LiPF$_4$C$_2$O$_4$, or LiF$_4$OP,) for use as a lithium ion battery electrolyte, said method consisting essentially of the steps of:
    heating solid LiPF$_6$ to 200° C. to generate a PF$_5$ gas;
    reacting the PF$_5$ gas with lithium oxalate to provide a reaction mixture;
    stirring the reaction mixture; and
    recrystallizing from a 1:1 mixture of dimethyl carbonate/ dichloromethane to remove LiPF$_6$ from LiF$_4$OP to form a lithium salt.

7. The method as claimed in claim 6, wherein said steps of stirring the reaction mixture and recrystallizing from the 1:1 mixture of dimethyl carbonate/dichloromethane are repeated.

8. The method as claimed in claim 6, wherein said step of stirring the reaction mixture is performed at a temperature of about 25° C.

9. The method as claimed in claim 6, wherein said method further has the step of transferring the PF$_5$ gas via a stream of N$_2$ into a suspension of lithium oxalate in dimethyl carbonate.

10. The method as claimed in claim 9, wherein said suspension of lithium oxalate in dimethyl carbonate is provided at about 25° C.

* * * * *